US011210372B2

(12) United States Patent
Savanah et al.

(10) Patent No.: US 11,210,372 B2
(45) Date of Patent: Dec. 28, 2021

(54) METHOD AND SYSTEM FOR VERIFYING OWNERSHIP OF A DIGITAL ASSET USING A DISTRIBUTED HASH TABLE AND A PEER-TO-PEER DISTRIBUTED LEDGER

(71) Applicant: nChain Holdings Limited, St. John's (AG)

(72) Inventors: Stephane Savanah, London (GB); Craig Steven Wright, London (GB)

(73) Assignee: nChain Holdings Limited, St. John's (AG)

( * ) Notice: Subject to any disclaimer, the term of this patent is extended or adjusted under 35 U.S.C. 154(b) by 0 days.

(21) Appl. No.: 16/300,514

(22) PCT Filed: May 12, 2017

(86) PCT No.: PCT/IB2017/052801
§ 371 (c)(1),
(2) Date: Nov. 9, 2018

(87) PCT Pub. No.: WO2017/195161
PCT Pub. Date: Nov. 16, 2017

(65) Prior Publication Data
US 2019/0163883 A1 May 30, 2019

(30) Foreign Application Priority Data

May 13, 2016 (GB) .................................. 1608454
May 13, 2016 (GB) .................................. 1608456
May 13, 2016 (GB) .................................. 1608463

(51) Int. Cl.
*G06F 21/10* (2013.01)
*G06F 21/12* (2013.01)
(Continued)

(52) U.S. Cl.
CPC .............. *G06F 21/121* (2013.01); *G06F 8/65* (2013.01); *G06F 16/152* (2019.01);
(Continued)

(58) Field of Classification Search
CPC ........ G06F 21/10; G06F 21/51; G06F 21/121; G06F 16/152; G06F 16/1834; G06F 8/65;
(Continued)

(56) References Cited

U.S. PATENT DOCUMENTS 5,715,403 A 2/1998 Stefik
5,944,821 A 8/1999 Angelo
(Continued)

FOREIGN PATENT DOCUMENTS

GB 2345775 A 7/2000
WO 03058451 A1 7/2003
(Continued)

OTHER PUBLICATIONS

Adam, "Using Tokens Built on Bitcoin to Fix DRM and Morph Software into Property," Tokenly, https://letstalkbitcoin.com/blog/post/tokens-software-and-the-coming-drm-revolution, Jun. 1, 2015 [retrieved Dec. 13, 2018], 8 pages.
(Continued)

*Primary Examiner* — Neha Patel
*Assistant Examiner* — Chunling Ding
(74) *Attorney, Agent, or Firm* — Davis Wright Tremaine LLP

(57) ABSTRACT

A computer-implemented method (600) and system (1) for verifying ownership of a computer software for installation using a distributed hash table (13) and a peer-to-peer distributed ledger (14). This may be the Bitcoin blockchain or an alternative blockchain implementation. The method includes determining (610) a second user public key associated with a second user (24) from a transaction record
(Continued)

stored on the peer-to-peer distributed ledger (14). A second public key associated with the second user may be determined (620) from an entry on the distributed hash table (13). The method further includes comparing (630) the second user public key and the second public key, and verifying (640) the ownership of the computer software based on the comparing of the second user public key and the second public key.

11 Claims, 10 Drawing Sheets

(51) Int. Cl.
    *G06F 21/60*     (2013.01)
    *H04L 9/32*     (2006.01)
    *H04L 29/08*     (2006.01)
    *H04L 29/06*     (2006.01)
    *G06F 21/51*     (2013.01)
    *H04L 9/08*     (2006.01)
    *G06F 16/14*     (2019.01)
    *G06F 16/182*     (2019.01)
    *G06F 8/65*     (2018.01)
    *G06F 21/57*     (2013.01)
    *G06F 21/62*     (2013.01)
    *G06F 21/64*     (2013.01)
    *H04L 9/06*     (2006.01)

(52) U.S. Cl.
    CPC .......... *G06F 16/1834* (2019.01); *G06F 21/10* (2013.01); *G06F 21/105* (2013.01); *G06F 21/12* (2013.01); *G06F 21/51* (2013.01); *G06F 21/57* (2013.01); *G06F 21/602* (2013.01); *G06F 21/6281* (2013.01); *G06F 21/64* (2013.01); *H04L 9/0637* (2013.01); *H04L 9/0643* (2013.01); *H04L 9/0841* (2013.01); *H04L 9/3236* (2013.01); *H04L 9/3247* (2013.01); *H04L 9/3263* (2013.01); *H04L 9/3265* (2013.01); *H04L 63/0435* (2013.01); *H04L 63/061* (2013.01); *H04L 63/0823* (2013.01); *H04L 67/104* (2013.01); *G06F 2221/0755* (2013.01); *G06F 2221/2107* (2013.01); *H04L 67/1065* (2013.01); *H04L 2209/38* (2013.01); *H04L 2209/56* (2013.01)

(58) Field of Classification Search
    CPC ...... G06F 21/57; G06F 21/6281; G06F 21/44; G06F 21/62; G06F 21/105; G06F 21/602; G06F 2221/2107; H04L 9/0643; H04L 9/0841; H04L 63/0823; H04L 9/3236; H04L 9/3247; H04L 9/3265; H04L 67/104; H04L 9/0637; H04L 9/3263; H04L 67/1065; H04L 2209/38; H04L 2209/56; G06Q 20/3827; G06Q 2220/00; G06Q 20/223
    See application file for complete search history.

(56) References Cited

U.S. PATENT DOCUMENTS

| | | | |
|---|---|---|---|
| 9,679,276 B1 | 6/2017 | Cuende | |
| 9,940,444 B1* | 4/2018 | Murphy | ................ H04L 9/3226 |
| 10,050,779 B2 | 8/2018 | Alness et al. | |
| 2008/0133706 A1* | 6/2008 | Chavez | ................ H04L 67/108 |
| | | | 709/218 |
| 2012/0272336 A1* | 10/2012 | Cohen | .................... H04L 63/08 |
| | | | 726/28 |
| 2012/0284794 A1 | 11/2012 | Trent et al. | |
| 2014/0165158 A1 | 6/2014 | Chan et al. | |
| 2015/0098567 A1 | 4/2015 | Park | |
| 2015/0120567 A1 | 4/2015 | Van Rooyen et al. | |
| 2015/0120569 A1* | 4/2015 | Belshe | ................ G06Q 20/065 |
| | | | 705/71 |
| 2015/0242958 A1 | 8/2015 | D'Zmura | |
| 2015/0264077 A1 | 9/2015 | Berger et al. | |
| 2015/0269570 A1 | 9/2015 | Phan et al. | |
| 2015/0271679 A1 | 9/2015 | Park et al. | |
| 2016/0035054 A1 | 2/2016 | Branscomb et al. | |
| 2016/0048688 A1 | 2/2016 | Flynn et al. | |
| 2016/0085955 A1 | 3/2016 | Lerner | |
| 2016/0098723 A1 | 4/2016 | Feeney | |
| 2016/0105265 A1 | 4/2016 | Wang et al. | |
| 2016/0162897 A1 | 6/2016 | Feeney | |
| 2016/0203572 A1* | 7/2016 | Mcconaghy | ........... G06Q 20/10 |
| | | | 705/58 |
| 2016/0218882 A1* | 7/2016 | Wood | ..................... H04L 9/3247 |
| 2016/0241389 A1* | 8/2016 | Le Saint | ................ H04L 9/0825 |
| 2016/0283920 A1 | 9/2016 | Fisher et al. | |
| 2016/0292396 A1 | 10/2016 | Akerwall | |
| 2016/0321676 A1 | 11/2016 | McCoy et al. | |
| 2016/0335288 A1 | 11/2016 | Qiu et al. | |
| 2016/0342977 A1 | 11/2016 | Lam | |
| 2016/0344737 A1 | 11/2016 | Anton et al. | |
| 2017/0048216 A1 | 2/2017 | Chow et al. | |
| 2017/0141926 A1* | 5/2017 | Xu | ........................ H04L 9/3252 |
| 2017/0236123 A1* | 8/2017 | Ali | ..................... G06Q 20/3825 |
| | | | 705/75 |
| 2017/0300978 A1* | 10/2017 | Narasimhan | ....... G06Q 20/3829 |
| 2017/0316390 A1* | 11/2017 | Smith | ..................... H04L 9/3242 |
| 2017/0324711 A1* | 11/2017 | Feeney | ................ H04L 9/3247 |
| 2018/0117447 A1* | 5/2018 | Tran | ...................... A63B 71/145 |
| 2018/0300507 A1 | 10/2018 | Uhr et al. | |
| 2018/0374173 A1* | 12/2018 | Chen | ..................... G06Q 50/184 |

FOREIGN PATENT DOCUMENTS

| | | |
|---|---|---|
| WO | 2014201059 A1 | 12/2014 |
| WO | 2016105265 A1 | 6/2016 |

OTHER PUBLICATIONS

Bitcoin Wiki, "Contract," Bitcoin Wiki, https://en.bitcoin.it/wiki/Contract, Aug. 10, 2017 [retrieved Feb. 5, 2018], 13 pages.

Bitcoin Wiki, "Proof of Ownership," Bitcoin Wiki, https://en.bitcoin.it/wiki/Proof_of_Ownership, Mar. 1, 2015 (last updated Oct. 22, 2015) [retrieved Dec. 13, 2018], 2 pages.

blockchain.com, "Homepage," Blockchain Luxembourg S.A., https://www.blockchain.com/, Jan. 1, 2018 [retrieved Dec. 14, 2018], 3 pages.

Coinskillthefed et al., "Using blockchain to publish downloadable software verification codes," Bitcoin Stack Exchange, https://bitcoin.stackexchange.com/questions/24489/using-blockchain-to-publish-downloadable-software-verification-codes, Apr. 11, 2014 [retrieved Dec. 13, 2018], 5 pages.

Conftool, "ConfTool: Conference Management Software," Conftool.net, https://www.conftool.net/landandpoverty2016/%20index.php/Anand-594-594_paper.pdf?page=downloadPaper&filename=Anand-594-594_paper.pdf&form_id=594&form_version=final, May 31, 2018 [retrieved Dec. 13, 2018], 1 page.

Crosby et al., "BlockChain Technology: Beyond Bitcoin," University of California Berkeley, Sutardja Center for Entrepreneurship & Technology Technical Report, Oct. 16, 2015, 35 pages.

Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.

International Search Report and Written Opinion dated Aug. 1, 2017, International Patent Application No. PCT/IB2017/052800, filed May 12, 2017, 9 pages.

International Search Report and Written Opinion dated Aug. 1, 2017, International Patent Application No. PCT/IB2017/052801, filed May 17, 2017, 9 pages.

(56) References Cited

OTHER PUBLICATIONS

International Search Report and Written Opinion dated Aug. 1, 2017, International Patent Application No. PCT/IB2017/052804, filed May 12, 2017, 9 pages.

Monax, "Eris + IPFS," Monax Blog, https://monax.io/2015/11/01/eris-and-ipfs/?redirect_from_eris=true, Nov. 16, 2016, 5 pages.

Shomer et al., "Colored-Coins/Colored-Coins-Protocol-Specification," GitHub, https://github.com/Colored-Coins/Colored-Coins-Protocol-Specification/wiki/Metadata, Jun. 11, 2015 (last updated Nov. 9, 2016) [retrieved Dec. 13, 2018], 6 pages.

Snow et al., "Factom Ledger by Consensus Version 1.0," Brave New Coin, https://bravenewcoin.com/insights/factom-ledger-by-consensus, Jan. 17, 2015, 28 pages.

Snow et al., "Factom: Business Processes Secured by Immutable Audit Trails on the Blockchain Version 1.2," factom.com, Apr. 25, 2018, 38 pages.

Stampery, "Features: Blockchain-based data certification at your fingertips," Stampery.com, https://stampery.com/features/, archived Mar. 5, 2016 [retrieved Nov. 3, 2016], 4 pages.

Vayngrib, "DHT hardening," GitHub, https://github.com/tradle/about/wiki/DHT-hardening, Feb. 2, 2015 (last updated May 21, 2015) [retrieved Dec. 13, 2018], 5 pages.

Wikipedia, "File verficiation," Wikipedia.org, https://en.wikipedia.org/wiki/File_verification, Apr. 14, 2004 (last edited Jul. 25, 2018) [retrieved Dec. 13, 2018], 3 pages.

Wikipedia, "InterPlanetary File System," Wikipedia.org, https://en.wikipedia.org/wiki/InterPlanetary_File_System, Sep. 11, 2015 (last updated Dec. 3, 2018) [retrieved Dec. 13, 2018], 4 pages.

Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.

Zyskind et al., "Enigma: Decentralized Computation Platform with Guaranteed Privacy," arXiv preprint arXiv:1506, Jun. 10, 2015, 14 pages.

Anand et al., "Colored Coins: Bitcoin, Blockchain, and Land Administration," 2017 World Bank Conference on Land and Poverty, Mar. 20, 2017, 10 pages.

UK Commercial Search Report dated Jan. 12, 2017, Patent Application No. GB1608454.3, filed May 13, 2016, 8 pages.

UK Commercial Search Report dated Nov. 24, 2016, Patent Application No. GB1608456.8, filed May 13, 2016, 7 pages.

UK Commercial Search Report dated Sep. 30, 2016, Patent Application No. GB1608463.4, filed May 13, 2016, 7 pages.

UK IPO Search Report dated Dec. 13, 2016, Patent Application No. GB1608454.3, filed May 13, 2016, 3 pages.

UK IPO Search Report dated Dec. 15, 2016, Patent Application No. GB1608456.8, filed May 13, 2016, 3 pages.

UK IPO Search Report dated Dec. 21, 2016, Patent Application No. GB1608463.4, filed May 13, 2016, 3 pages.

Zyskind et al., "Decentralizing Privacy: Using a Blockchain to Protect Personal Data," 2015 IEEE CS Security and Privacy Workshops, May 21, 2015, 5 pages.

\* cited by examiner

METHOD AND SYSTEM FOR VERIFYING OWNERSHIP OF A DIGITAL ASSET USING A DISTRIBUTED HASH TABLE AND A PEER-TO-PEER DISTRIBUTED LEDGER

TECHNICAL FIELD

The present disclosure relates to security, control and verification methods for ensuring authorised control of a digital asset. The invention is particularly suited for verifying ownership/authorised control of an item of computer software. This may comprise using a distributed hash table and a peer-to-peer distributed ledger (blockchain).

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

Due to the tamper-proof record which they provide, blockchains are well suited for applications in which control, visibility of events and secure transactions/exchanges are important. One such suitable application area is the exchange or transfer of digital assets such as, for example, software. Traditional approaches to securing the integrity and sharing of computer software involve the digital signing of the executables of the computer software. For instance, signing the executable or other associated code with a cryptographic pair of keys, such as a public key and a private key. The public key is often obtained from a trusted central authority such as a certification authority.

Computer software is often accompanied by a licence containing contractual obligations. The licence may contain the terms that govern the use or redistribution of the software. However, an issue may arise where the computer software or the associated licence is transferred to another user in an unauthorised or undesired manner.

Computer software or programs generally require installation before execution of the instructions contained therein can occur. Installation prepares the computer software or program for the execution. Computer software or programs often come with an installer that performs the installation. After installation is performed once, it does not need to be performed again, and the computer software or program may be executed over and over.

It is imperative to verify ownership of the software upon installation. This is to ensure that, for example, the software has not been transferred to the wrong owner or contrary to authorisation. Therefore, it is desirable to provide a solution which facilitates or enables the verification of ownership and/or transfer of a controlled digital asset or resource such as software. This, in turn would aid in ensuring the integrity of the software and the electronic transfer process.

Any discussion of documents, acts, materials, devices, articles or the like which have been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

The invention provides method(s) and corresponding system(s) as defined in the appended claims. The invention may provide a computer-implemented control and verification method/system. It may enable or facilitate the transfer of a controlled asset between users on a computer-based network. The asset may be a digital asset. Herein, the term "user" may be used to refer to a computer-based resourced. The controlled asset may be a portion or item of software. The invention may provide a computer-implemented method of verifying a controlled asset e.g. a portion of computer software. It may be a method of verifying ownership or authorisation of the software. The software may be verified for installation on a computer-based resource.

The method may comprise using a distributed hash table and a peer-to-peer distributed ledger (blockchain). The method may comprise determining a second user public key (PU2) associated with a second user (U2) from a transaction record stored on the peer-to-peer distributed ledger; determining a second public key (P2) associated with the second user (U2) from an entry stored on the distributed hash table; comparing the second user public key (PU2) and the second public key (P2); and verifying the ownership of the computer software based on the comparing of the second user public key (PU2) and the second public key (P2).

It should be noted that the second user public key (PU2) and the second public key (P2) may be stored in, and retrieved from, separate technical sources i.e. a blockchain and a DHT respectively. Thus, the invention may comprise the use of different and distinct storage resources, with intercommunication and transfer of data between them. By searching, processing and retrieving data from the DHT and the blockchain, the invention is able to achieve the enhanced control, security and verification effects which result in a more secure approach to digital asset (e.g. software) installation, transfer and authorisation.

In the method, comparing the second user public key (PU2) and the second public key (P2) may comprise determining whether the second user public key (PU2) and the second public key (P2) match. The term "match" may comprise a correspondence, equality or association between the second user public key (PU2) and the second public key (P2).

In the method, the computer software may comprise a header and a body. The header may comprise a hash value of the body of the computer software. The header may further comprise a hash value (H2) of a data associated with the computer software or a licence. The body of the computer software may comprise an executable of the computer software.

In the method, before determining the second user public key (PU2), the method may comprise encrypting the executable of the computer software. Encrypting the executable of the computer software may comprise determining a generator value (GV); determining a second user second public key (P2U2) based on the second user public key (PU2) and the generator value (GV), wherein the second user second public key (P2U2) forms a cryptographic pair with a second user second private key (V2U2); determining a first user second public key (P2U1) based on a first user public key (PU1) and the generator value (GV), wherein the first user second public key (P2U1) forms a cryptographic pair with a first user second private key (V2U1); determining a common secret (CS) based on the second user second public key (P2U2) and the first user second private key (V2U1); and encrypting the computer software with the common secret (CS) to generate an encrypted executable of the computer software.

In the method, the encrypted executable of the computer software may be decrypted by determining the common secret (CS) based on the first user second public key (P2U1) and the second user second private key (V2U2); and decrypting the executable of the computer software with the common secret (CS) to generate a decrypted executable of the computer software.

The method may further comprise installing the decrypted executable of the computer software on a processing device associated with the second user (U2).

The method may further comprise determining an activation key (AK) from the second user (U2); and executing instructions of the decrypted executable of the computer software based on the activation key (AK).

A computer software program comprising machine-readable instructions to cause a processing device to implement the method described above.

A computer system for verifying ownership of a computer software for installation using a distributed hash table and a peer-to-peer distributed ledger, the system comprising a processing device associated with a node on a peer-to-peer network of nodes, configured to determine a second user public key (PU2) associated with a second user (U2) from a transaction record stored on the peer-to-peer distributed ledger; determine a second public key (P2) associated with the second user (U2) from an entry stored on the distributed hash table; compare the second user public key (PU2) and the second public key (P2); and verify the ownership of the computer software based on the compare of the second user public key (PU2) and the second public key (P2).

Figure 2:
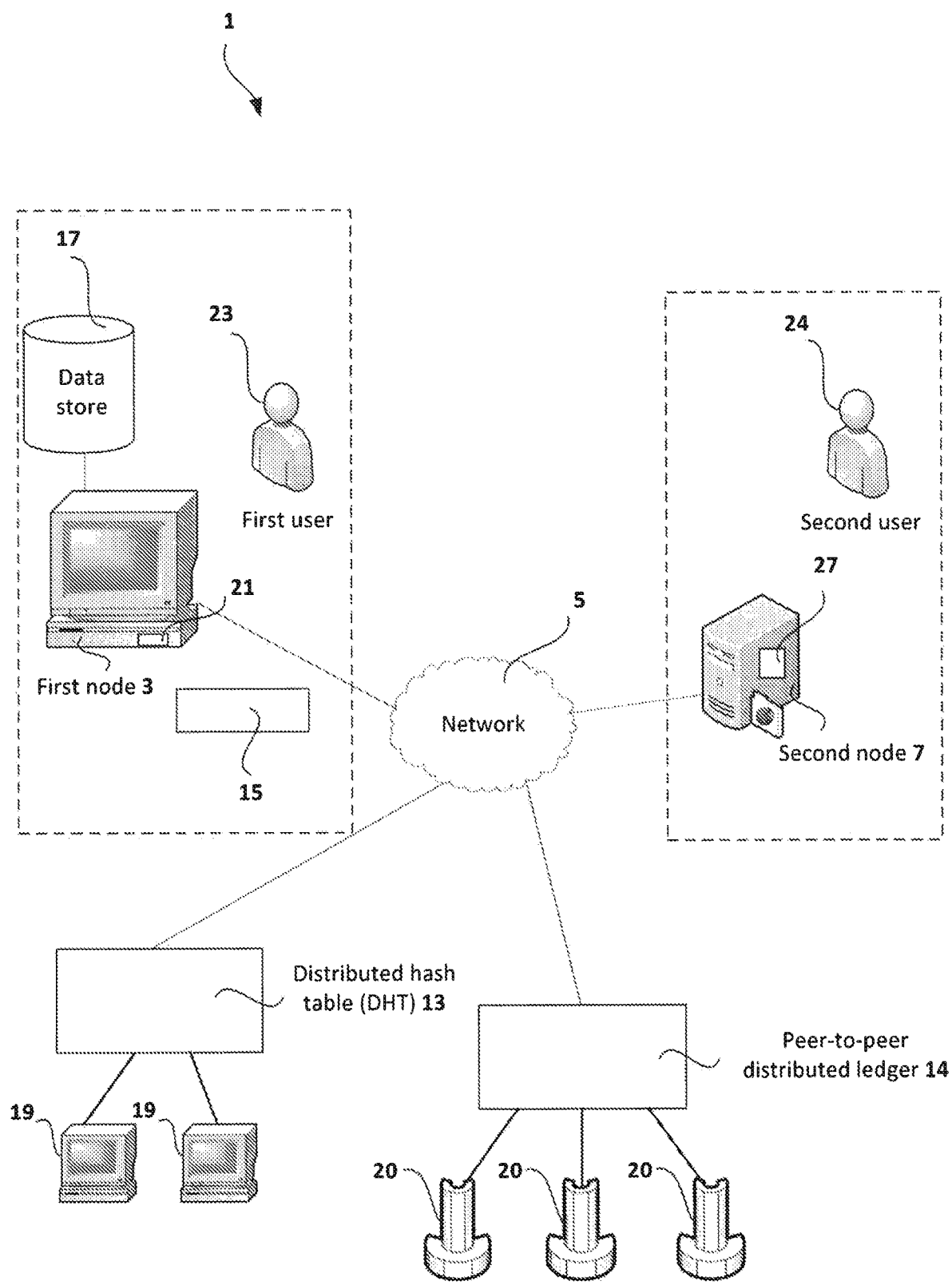
Figure 3:
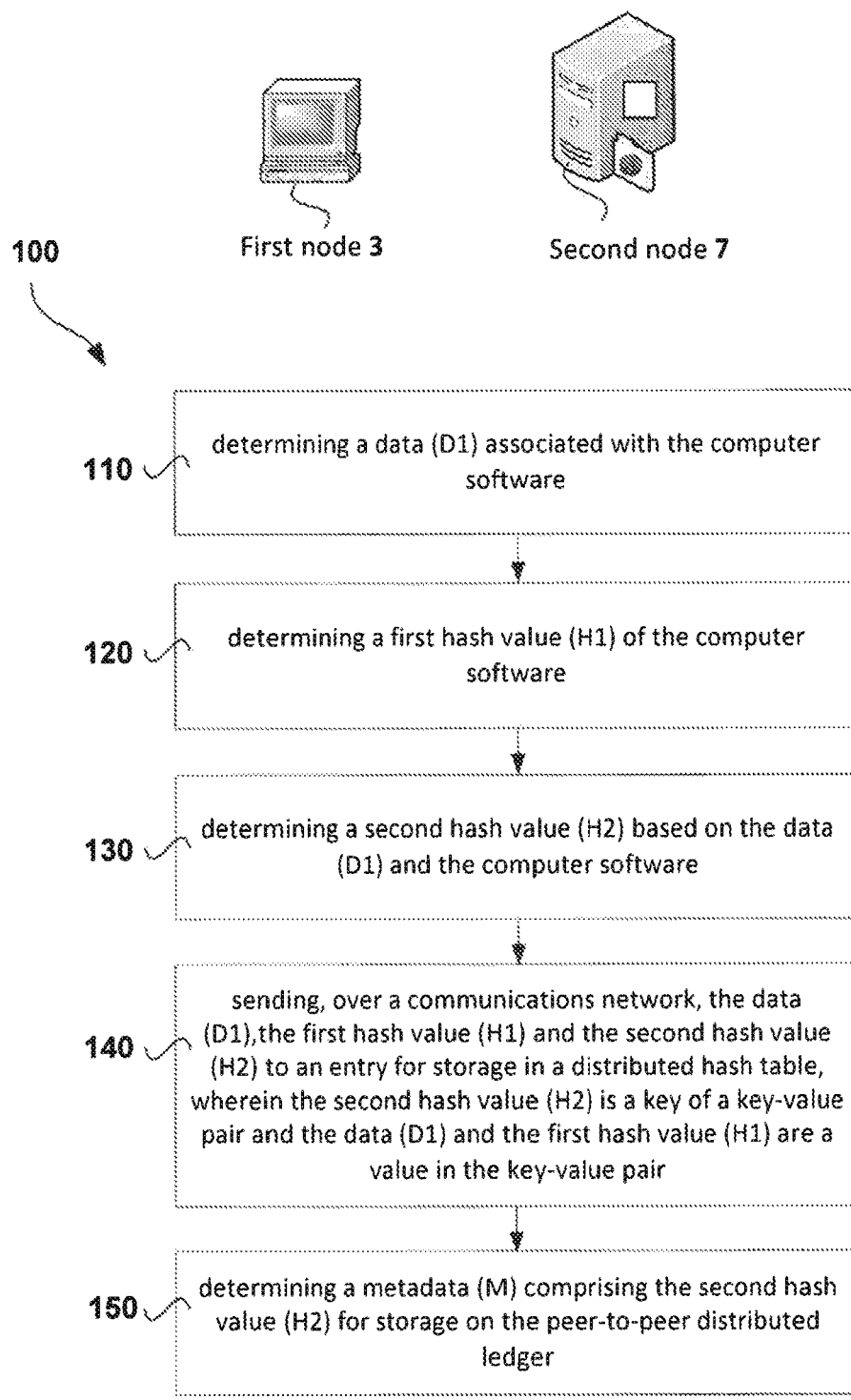
Figure 4:
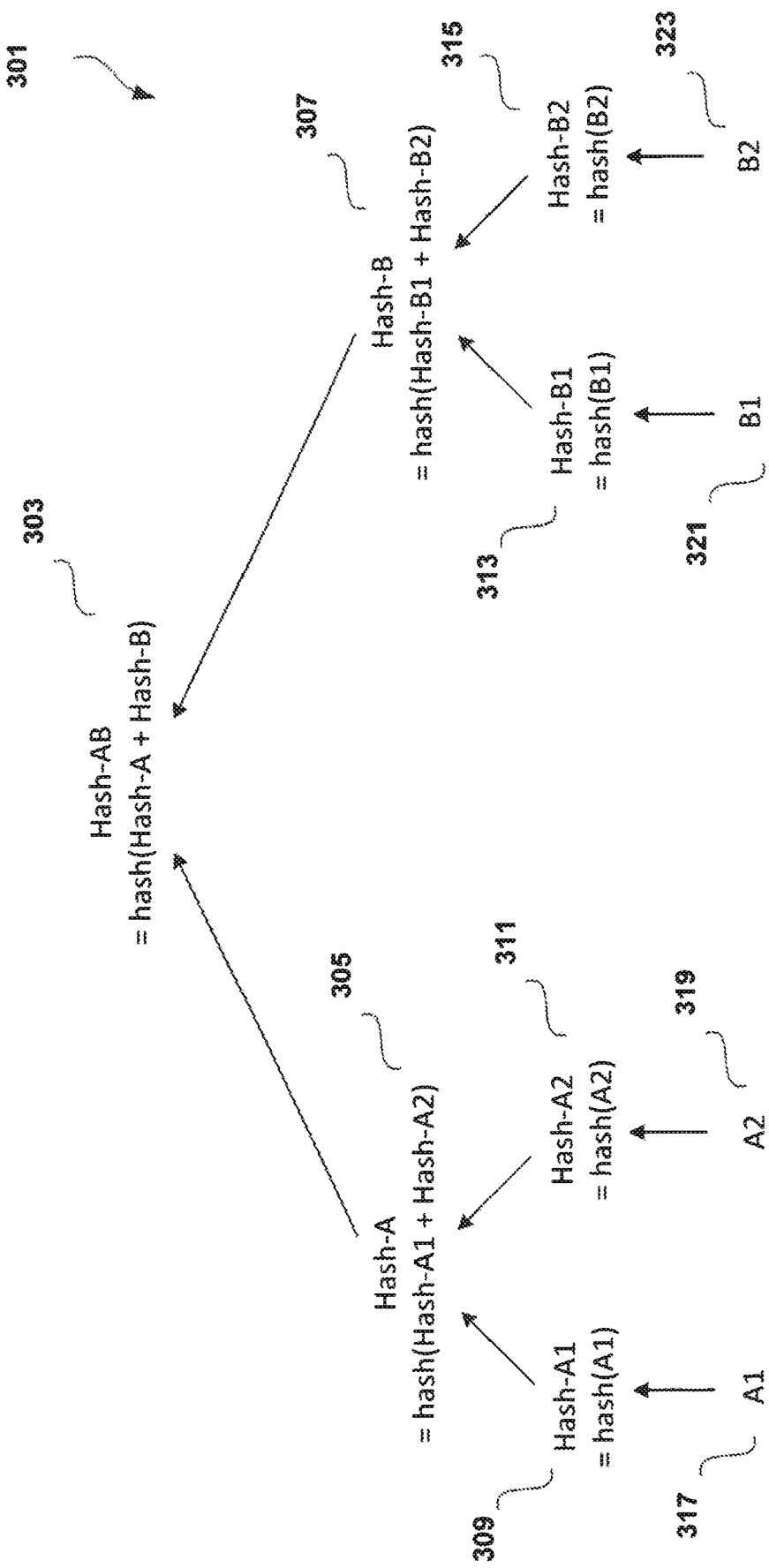
Figure 5:
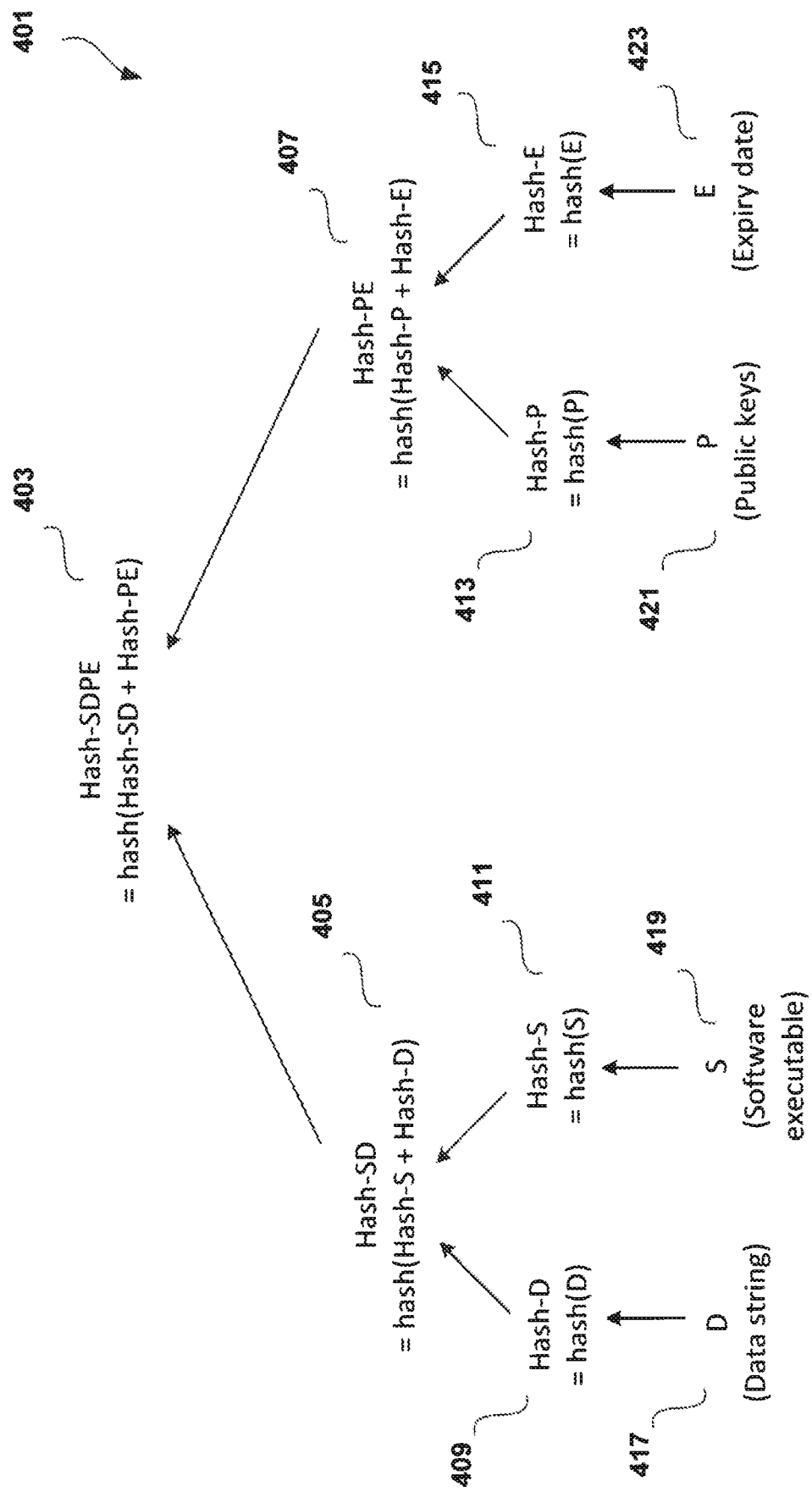
Figure 6:
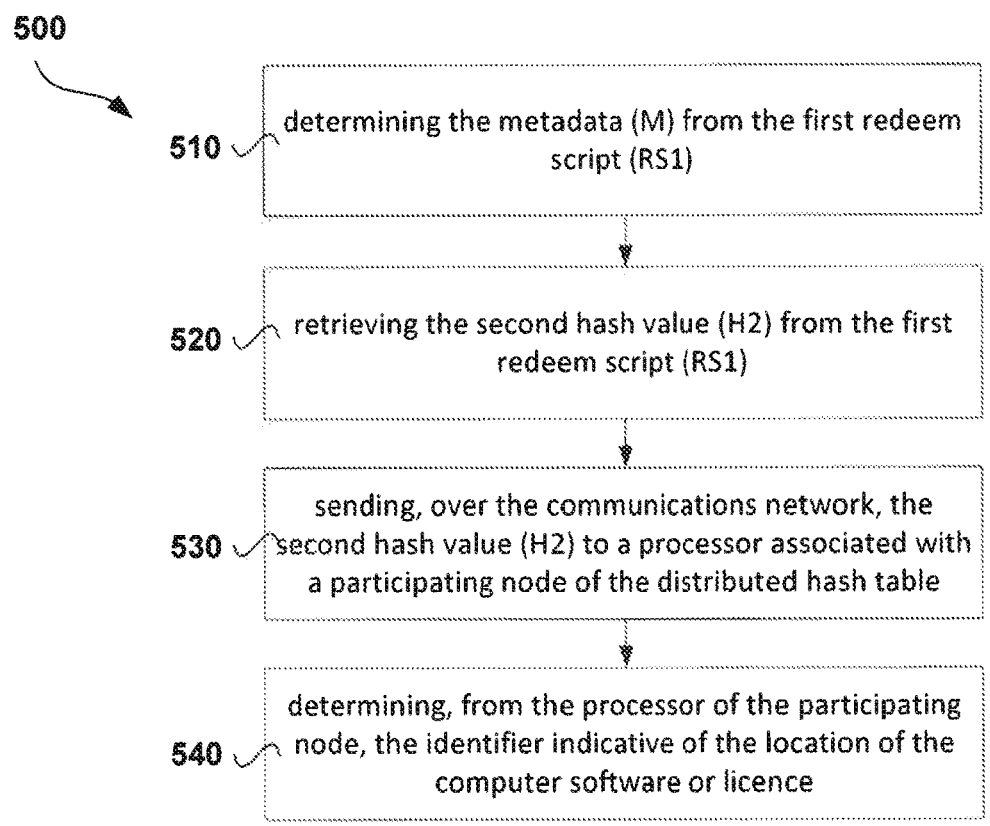
Figure 7:
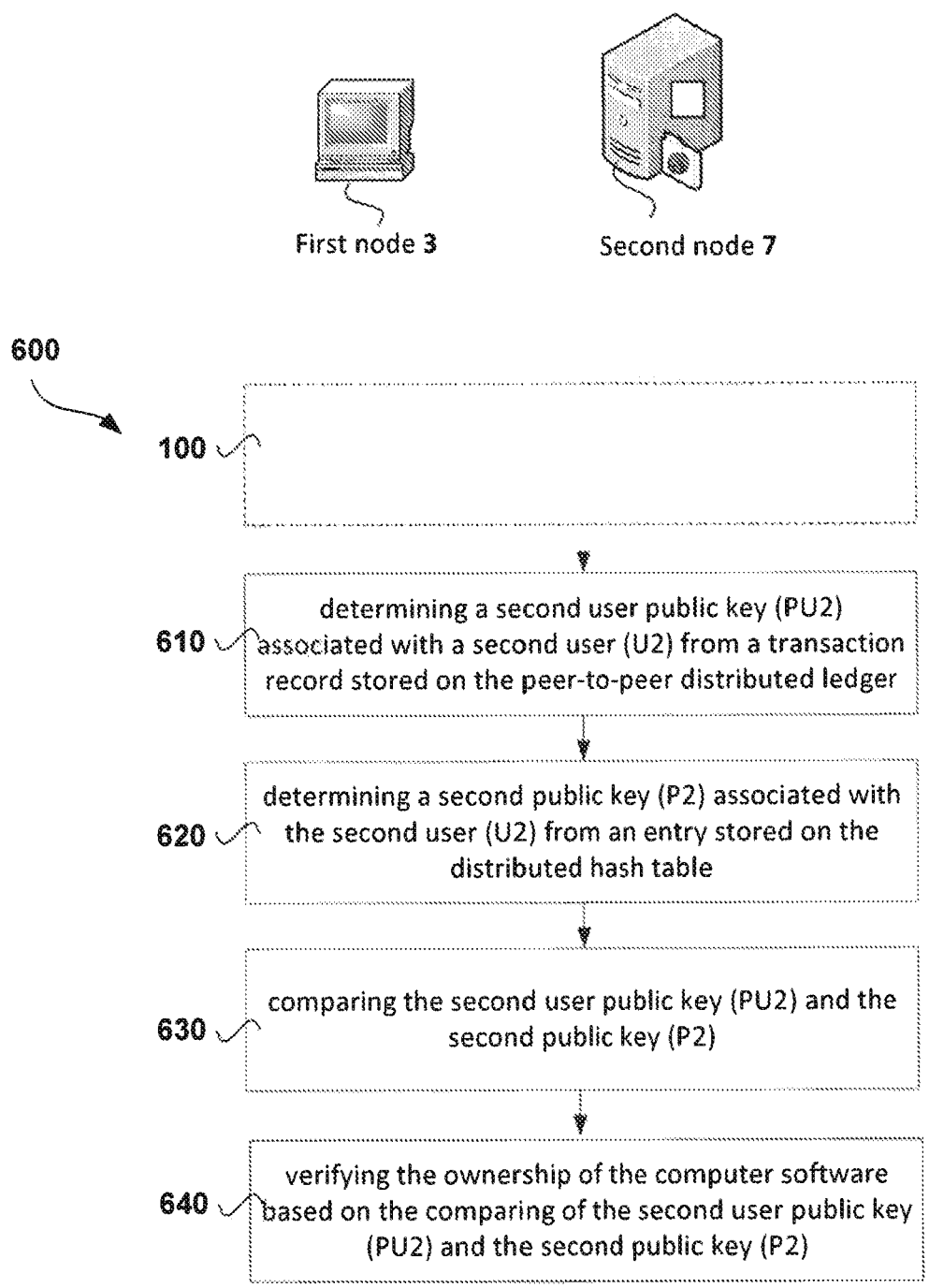
Figure 8:
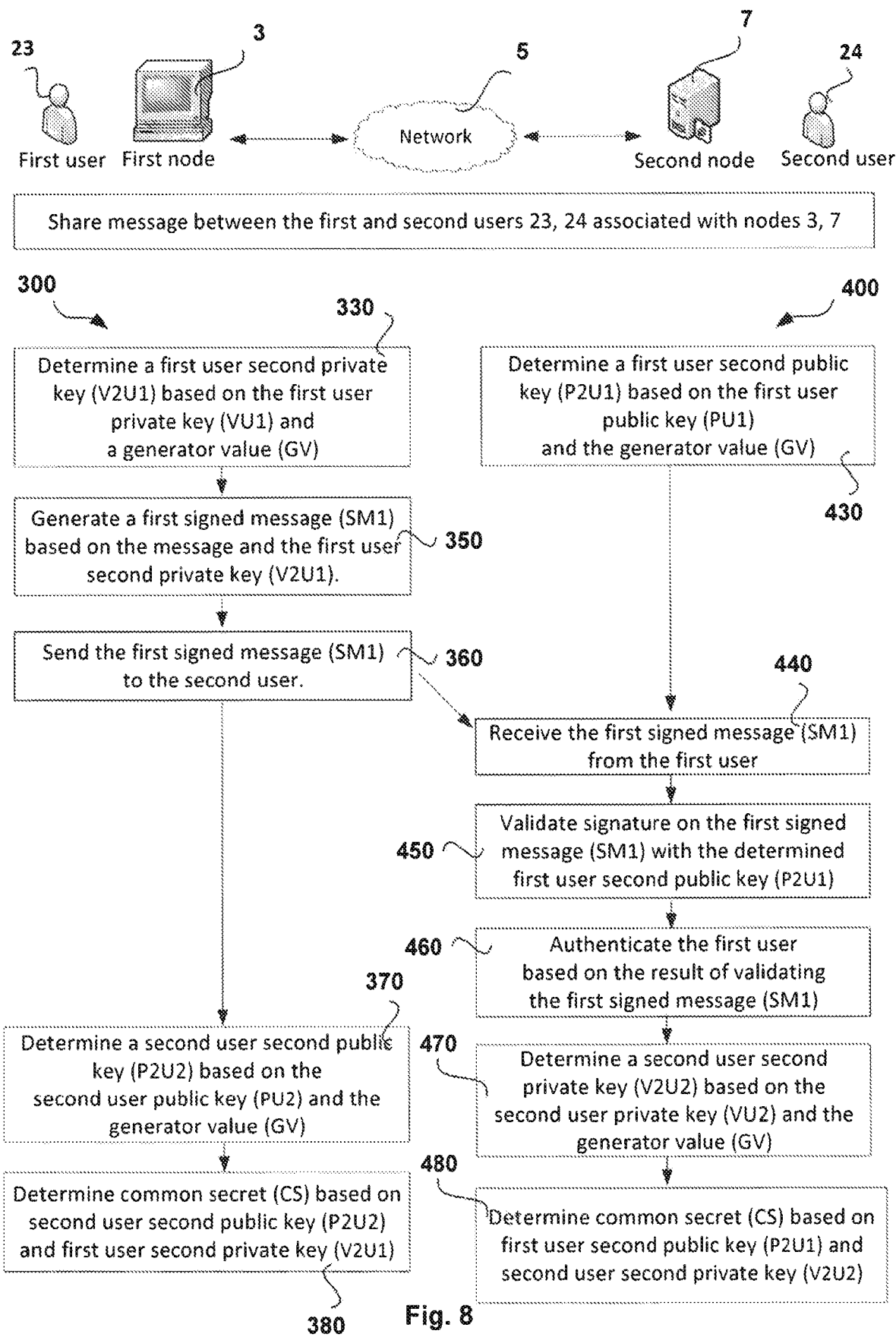
Figure 9:
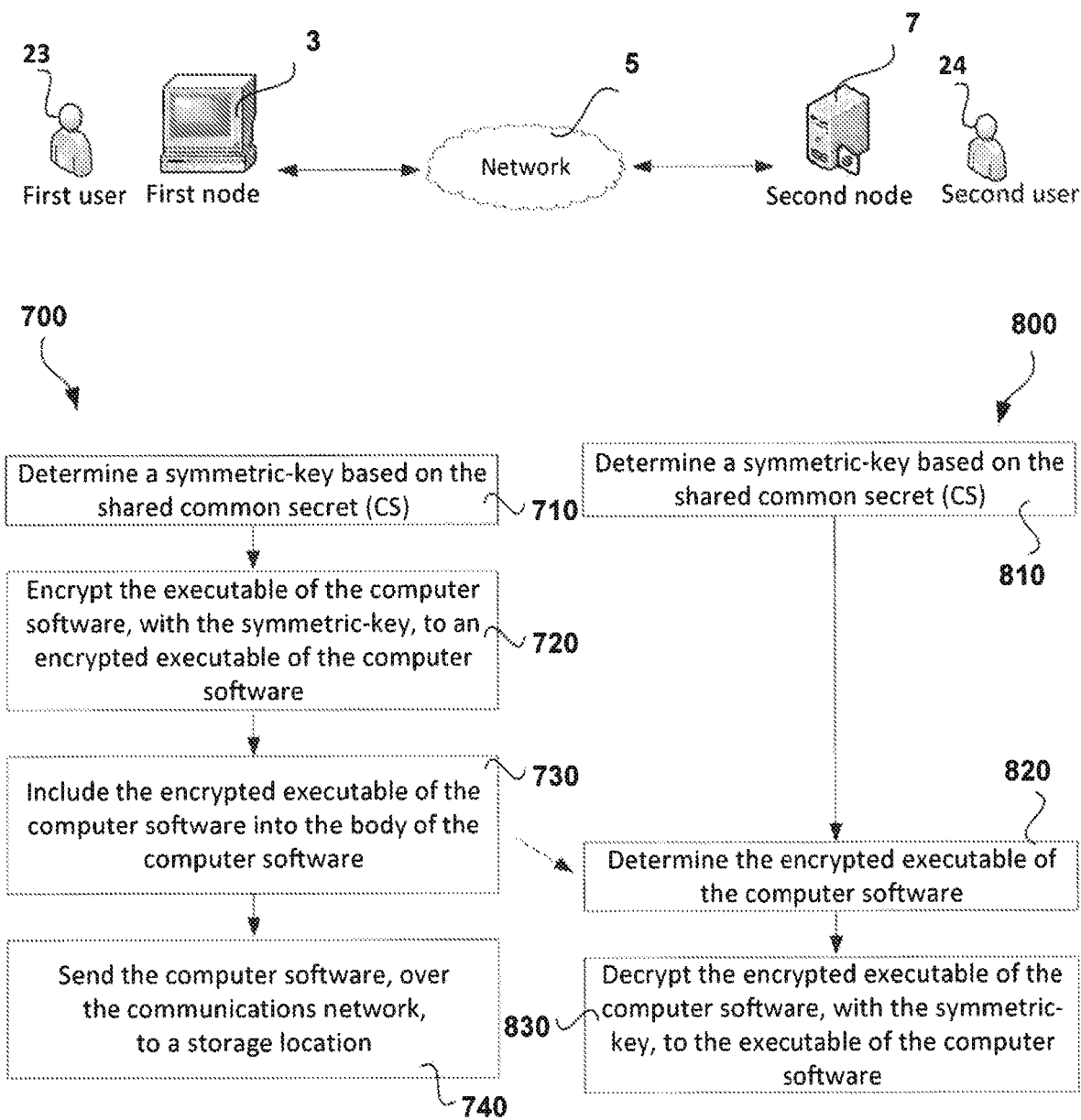
Figure 10:
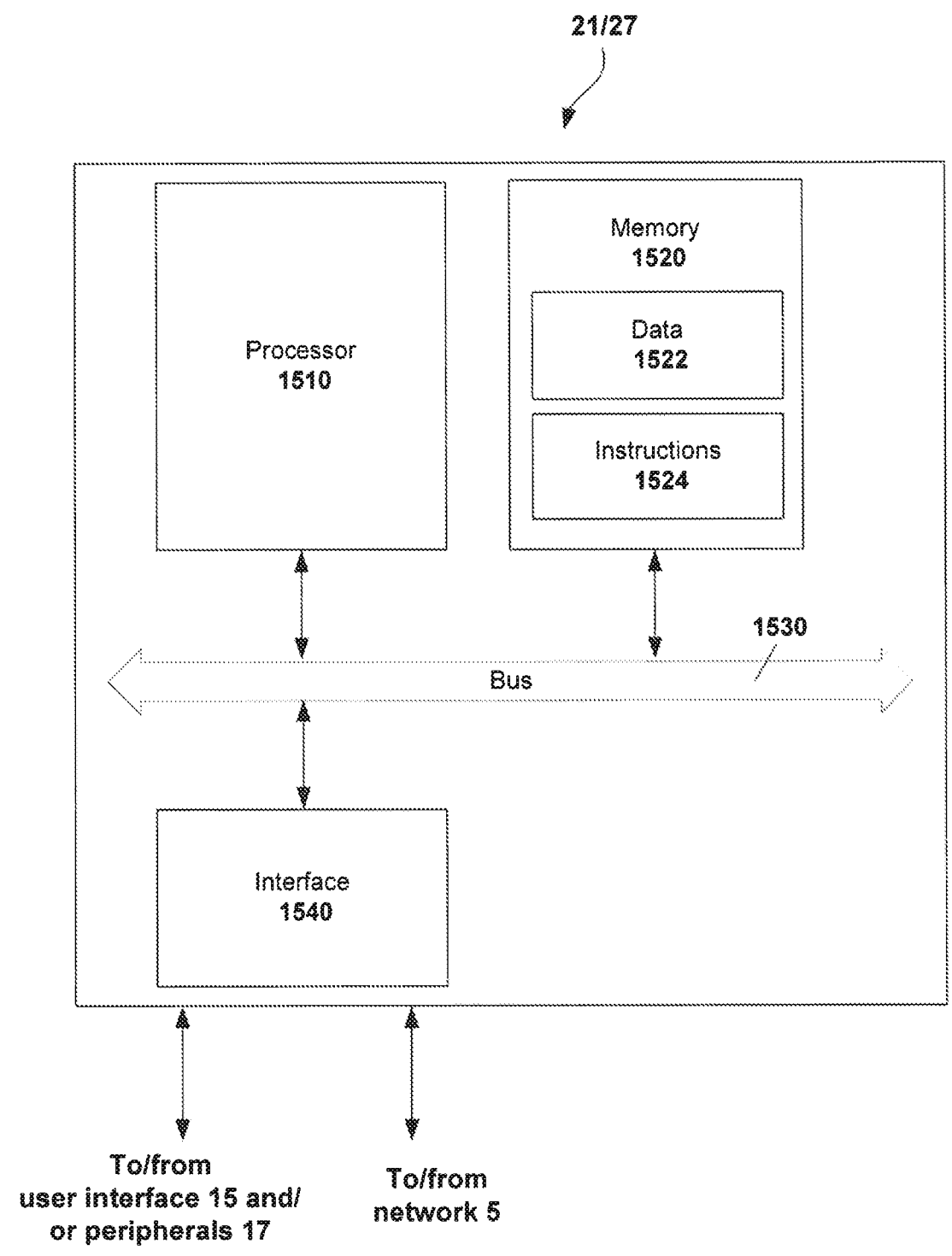

Examples of the present disclosure will be described with reference to:

FIG. 2 illustrates a schematic diagram of an example system for determining a metadata (M) for securing computer software of a computer software for installation using a distributed hash table;

FIG. 3 illustrates a flow chart of a computer-implemented method for determining a metadata (M) for securing a computer software using a distributed hash table;

FIG. 4 illustrates an example of a Merkle tree;

FIG. 5 illustrates an example of a Merkle tree with reference to a computer software and a licence associated with a computer software;

FIG. 6 illustrates a flow chart of a computer-implemented method for determining an identifier indicative of the location of a computer software using a distributed hash table;

FIG. 7 illustrates a flow chart of a computer-implemented method for verifying ownership of a computer software for installation using a distributed hash table and a peer-to-peer distributed ledger;

FIG. 8 illustrates a flow chart of computer-implemented methods for determining a common secret;

FIG. 9 illustrates a flow chart of computer-implemented methods for encrypting an executable of a computer software;

FIG. 10 illustrates a schematic of an example processing device.

DESCRIPTION OF EMBODIMENTS

The present disclosure generally relates to methods and systems for utilising a distributed hash table and a peer-topeer (P2P) distributed ledger, such as the Bitcoin blockchain, to enable verifying a computer software for installation.

While embodiments described below may refer specifically to transactions that occur on the Bitcoin blockchain (referred to herein as the blockchain), it will be appreciated that the present invention may be implemented using other P2P distributed ledgers. The blockchain is used below to describe aspects of the invention for simplicity only due to its high level of standardisation and large quantity of associated public documentation.

Distributed Hash Table

In a typical client/server model a central server may be in charge of the majority of resources. This means that in the event of an attack or failure on the central server, the majority of the resources stored on the central server may be compromised. On the contrary, in a distributed model the resources are shared ("distributed") between participating nodes. In this way, the capacity of all participating nodes is utilised and the failure of one server will not compromise the majority of the resources.

Figure 1:
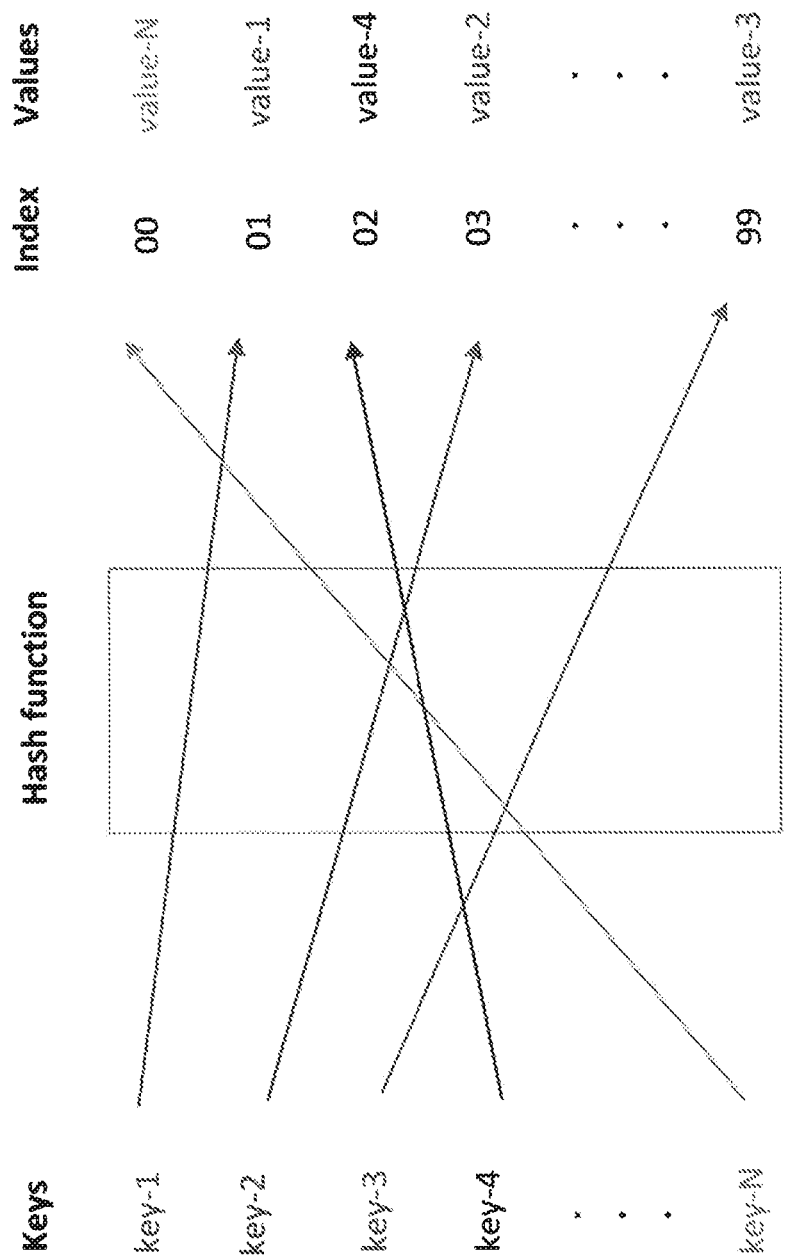
FIG. 1 illustrates an example of a hash table.

FIG. 1 illustrates an example of a hash table. The hash table is comprised of key-value pairs. The key of each key-value pair is mapped, by way of a hash function, to an index. The index defines the location of stored values of the key-value pairs.

A DHT is an example of applying the distributed model to a hash table. Similar to a hash table, a DHT comprises key-value pairs and provides an efficient method to locate ("lookup") a value of a key-value pair given just the key. However, in contrast to the hash table, the key-value pairs are distributed and stored by a number of participating nodes. In this way, responsibility for storing and maintaining the key-value pairs is shared by the participating nodes.

In the same way as a hash table, each key-value pair in the DHT is mapped to an index. The index is determined for each key-value pair by performing a hash function on the key. For example, the cryptographic Secure Hash Algorithm SHA-1 may be used to determine the index.

Each participating node is assigned at least one index by keyspace partitioning. For each index that the participating node is assigned, the participating node stores the value of that key-value pair.

It is an advantage that values of the key-value pairs may be efficiently retrieved. To retrieve a value associated with a key, a node may execute a "lookup" to determine the responsible node (via the index). The responsible node may then be accessed to determine the value.

Bitcoin and the Blockchain

As is well known in the art, the blockchain is a transaction type ledger of database where storage capacity is distributed across networked nodes participating in a system based on the Bitcoin protocol. Each Bitcoin transaction is broadcast to the network, the transactions are confirmed and then aggregated into blocks. The blocks are then included on the blockchain by storing the blocks at multiple participating nodes.

A full copy of a cryptocurrency's P2P distributed ledger contains every transaction ever executed in the cryptocurrency. Thus, a continuously growing list of transactional data records is provided. Since each transaction entered onto the blockchain is cryptographically enforced, the blockchain is hardened against tampering and revision, even by operators of the participating nodes.

Due to the transparency of the blockchain, histories are publicly available for each transaction. It is a further advantage of the blockchain that the transaction and the record of the transaction are the same. In this way, the information relating to the transaction is captured in the actual transaction. This record is permanent and immutable and therefore removes the requirement for a third party to keep the transaction record on a separate database.

Pay-to-Script-Hash and Multi-Signature

While embodiments below may refer specifically to transactions that use the pay-to-script-hash (P2SH) method of the Bitcoin protocol, it will be appreciated that the present invention may be implemented using another method of the Bitcoin protocol such as the pay-to-public-key-hash method.

Each transaction record on the blockchain comprises a script including information indicative of the transaction and a number of public keys. These public keys may be associated with the sender and recipient of the cryptocurrency. A script can be considered as a list of instructions recorded with each transaction record on the blockchain that describes how a user may gain access to the cryptocurrency specified in the transaction record.

As background, in a standard P2SH method of the Bitcoin protocol, the output script, or redeem script, may take the form:

<NumSigs PubK1 PubK2 . . . PubK15 NumKeys OP_CHECKMULTISIG> where NumSigs is the number "m" of valid signatures required to satisfy the redeem script to unlock the transaction; PubK1, PubK2 . . . PubK15 are the public keys that correspond to signatures that unlock the transaction (up to a maximum of 15 public keys) and NumKeys is the number "n" of public keys.

In the Bitcoin protocol, signatures based on a user's private key may be generated using the Elliptic Curve Digital Signature Algorithm. The signatures are then used for redemption of the cryptocurrency associated with the output script or redeem script. When a user redeems an output script or redeem script, the user provides their signature and public key. The output script or redeem script then verifies the signature against the public key.

To redeem the above redeem script, at least a number "m" of signatures corresponding to the public keys are required. In some examples, the order of the public keys is important and the number "m" out of "n" signatures for signing must be done in sequence. For example, consider where "m" is 2 and "n" is 15. If there are two signatures are available for use, Sig1 (corresponding to PubK1) and Sig 15 (corresponding to PubK15), the redeem script must be signed by Sig1 first followed by Sig15.

Overview of the System

A method, device and system for determining a metadata (M) for securing a computer software and verifying ownership of a computer software for installation will now be described.

FIG. 2 illustrates a system 1 that includes a first node 3 that is in communication with, over a communications network 5, a second node 7. The first node 3 has an associated first processing device 21 and the second node 5 has an associated second processing device 27. Examples of the first and second nodes 3, 7 include an electronic device, such as a computer, tablet computer, mobile communication device, computer server etc.

A DHT 13 to record and store key-value pairs is also illustrated in FIG. 2. The DHT 13 may be associated with one or more processing devices 19 to receive, record and store the values of the key-value pairs. The processing devices 19 may be used by participating nodes of the DHT 13. As described above, the DHT 13 provides an efficient method to locate values of key-value pairs.

FIG. 2 also illustrates a P2P distributed ledger 14 to record transactions. The P2P distributed ledger 14 may be associated with one or more processing devices 20 to receive and record transactions. As described above, an example of a P2P distributed ledger 14 is the Bitcoin blockchain. Therefore, in the context of the blockchain, the processing devices 20 associated with the P2P distributed ledger 14 may be processing devices referred to as "miners".

The first node 3 is associated with a first user 23 and the second node 7 is associated with a second user 24. In one example, the first node 3 may represent a vendor of the computer software. In another example, the first node 3 may represent an agent or service provider. In yet another example, the first node 3 may represent a user of the computer software.

The second node 7 may represent a user of the computer system. In another example, the second node 7 may represent an agent, service provider or vendor of the computer software.

In one example, the first node 3 performs the method 100, 300, 400, 500, 600, 700, 800 as illustrated by FIG. 3, FIG. 6, FIG. 7, FIG. 8 and FIG. 9. In another example, the second node 7 performs the method 100, 300, 400, 500, 600, 700, 800.

While the exemplary embodiments below may refer to the first node 3 as performing the methods or the second node 7 as performing the methods, it is to be understood the disclosure may also be adapted or modified to be performed by other nodes.

The method 100 as illustrated by FIG. 3 secures computer software and includes determining 110 a data (D1) associated with the computer software. The data (D1) may further comprise a licence associated with the computer software. The method 100 also includes determining 120 a first hash value (H1) based on the computer software. In one example, the first hash value (H1) may be in relation to an executable of the computer software.

The method 100 also includes determining 130 a second hash value (H2) based on the data (D1) and the computer software. In one example, the second hash value (H2) may be representative of the details of the computer software and the licence associated with the computer software. In a further example, the second hash value (H2) may comprise additional information.

The method 100 further includes sending 140, over a communications network 5, the data (D1), the first hash value (H1) and the second hash value (H2) to an entry on a distributed hash table 13, wherein the second hash value (H2) is assigned to a key of a key-value pair and the data (D1) and the first hash value (H1) are assigned to the value in the key-value pair. The value in the key-value pair may further comprise an identifier indicative of the location of the computer software or licence.

The method 100 also includes determining 150 a metadata (M) that is based on the second hash value (H2) for inclusion on the peer-to-peer distributed ledger 14. In one example, the metadata (M) may be included in a first redeem script (RS1) for inclusion on the peer-to-peer distributed ledger 14.

The method 600 as illustrated by FIG. 7 verifies ownership of computer software and is performed after the method described above. This is shown as the optional step 100 in FIG. 7. The method 600 includes determining 610 a second user public key (PU2) associated with a second user (U2) from a transaction record stored on the peer-to-peer distributed ledger 14. The second user public key (PU2) may be included in an output script of the transaction record. In another example, the second user public key (PU2) may be included in the metadata (M) that is on the peer-to-peer distributed ledger 14 as described above.

The method 600 also includes determining 620 a second public key (P2) associated with the second user (U2) from an entry stored on the distributed hash table 13. The second public key (P2) may be the same as the second user public key (PU2). The entry on the distributed hash table 13 may comprise a key-value pair.

The method 600 further includes comparing 630 the second user public key (PU2) and the second public key (P2). The method 600 also includes verifying 640 the ownership of the computer software based on the comparing of the second user public key (PU2) and the second public key (P2). In one example, verifying the ownership may indicate that the second user public key (PU2) and the second public key (P2) match.

A detailed example of the method 100, 600 will now be described.

Determining a Data Associated with the Computer Software 110

As described above the method 100 includes determining 110 a data (D1) associated with the computer software. Determining 110 a data (D1) may comprise receiving the data (D1) from a user, node or data store. Determining 110 a data (D1) may further comprise generating the data (D1) at the first node 3.

In one example, the first node 3 may receive the data (D1) from the first user 23 via the user interface 15. In another example, the first node 3 may receive the data (D1) from the second user 24. In yet another example, the first node 3 may receive the data (D1) from a data store 17.

Data (D1) is associated with the computer software where data (D1) may identify the computer software, additional information, a licence of the computer software or be indicative of the location of the computer software. For example, the data (D1) may comprise a string or data structure that identifies the computer software. The string or data structure may comprise a collection of identifying keywords and/or additional information about the computer software. An example of additional information may be an identifier of the version of the computer software, for example a numeral. For instance, if the computer software is entitled BobSoftware and the version is 3.0, the string or data structure (D1) may comprise "BobSoftware/3.0".

In a further example, the data (D1) may comprise an identifier of a licence associated with the computer software. This may be a software licence identification number (ID) or a software licence key. In another example, the identifier of the licence may comprise a cryptographic hash of the contents of the licence.

The data (D1) may further comprise an identifier indicative of the storage location of the computer software. In one example, the identifier may comprise a URL for an object on the Internet. In a further example, a link to the storage location of the computer software on a repository such as a hash table or distributed hash table may be provided.

In yet a further example the data (D1) may comprise information that identifies the vendor of the computer software. This may include personal details such as name, address, contact details or a public key associated with the vendor.

Determining a First Hash Value (H1) Based on the Computer Software 120

As also described above the method 100 further includes determining 120 a first hash value (H1) of the computer software. Determining 120 a first hash value (H1) may comprise receiving the first hash value (H1) from a user or accessing the first hash value (H1) from a data store. Determining 120 a first hash value (H1) may further comprise calculating the hash value at the first node 3.

In one example, the first node 3 may receive the first hash value (H1) from the first user 23 via the user interface 15. In another example, the first node 3 may receive the first hash value (H1) from the second user 24. In yet another example, the first node 3 may access the first hash value (H1) from a local data store 17 or remote data store.

In one example, the first hash value (H1) is of an executable of the computer software. The executable of the computer software may be retrieved from the communications network 5 such as the Internet. In another example, the executable may be provided by the first user 23 or the second user 24. In yet another example, the executable may be retrieved from the data store 17. In yet a further example, the executable may be retrievable from a repository such as a hash table or a DHT.

The hash of the executable of the software may be determined using the SHA-256 algorithm to create a 256-bit representation of the information. It is to be appreciated that other hash algorithms may be used, including other algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

Determining a Second Hash Value (H2) Based on the Data (D1) and the Computer Software 130

The method 100 also includes determining 130 a second hash value (H2) based on the data (D1) and the computer software.

In one example, the second hash value (H2) may be determined based on the hash of the concatenation of the data (D1) and the executable (or hash of the executable, that is, the first hash value (H1)) of the computer software. In a further example, the second hash value (H2) may be determined based on the hash of the concatenation of the data (D1), the executable (or hash of the executable) of the computer software and additional information.

Additional information may comprise a public key of the first user 23 (PU1) or second user 24 (PU2). In a further example the additional information may comprise an identifier of an entity associated with the first user 23 or second user 24. For instance, the entity may be an employer of the first user 23 or second user 24. In another example, the entity may be a service provider of the first user 23 or second user 24.

The additional information may further comprise a device identifier of a device associated with the first node 3, second node 7, first user 23 or second user 24. An example of a device is the first processing device 21 as illustrated in FIG. 2. The device identifier may comprise at least one of the following: a MAC address, motherboard serial number or a device identification number. The device identifier may further be a concatenation of at least two of the MAC address, motherboard serial number or device identification number. In a further example the device identifier may comprise a hash value associated with the MAC address, motherboard serial number or device identification number, or the concatenation described above.

In yet a further example the additional information may comprise an expiry date of the licence associated with the computer software.

Licence Associated with the Computer Software

In a further example, the second hash value (H2) may be determined based on the concatenation of the data (D1), the executable (or hash of the executable) of the computer software, additional information or the licence that relates to the computer software.

The representation of the licence may be a file or document which specifies the content of the licence. For example, a plain ASCII text, PDF document or Word document. The second hash value (H2) may include the licence in its original form, or for example it may provide a link to the location of the licence on a publicly accessible communications network such as the Internet. In a further example, a link to the location of the licence on a repository such as a hash table or DHT may be provided. In yet a further example, a link to the location of the licence on a computer-based resource, such as the data store 17 may be provided.

In one example, the licence may comprise the first hash value (H1) associated with the computer software.

The licence associated with the computer software may further comprise additional information as described above. In one example, the licence may be associated with a first user 23 or second user 24. The licence may comprise the public key of the first user 23 (PU1) or second user 24 (PU2). In a further example the licence may comprise an identifier of an entity associated with the first user 23 or second user 24.

The licence associated with the computer software may further comprise a device identifier of a device associated with the first node 3, second node 7, first user 23 or second user 24. An example of a device is the first processing device 21 as illustrated in FIG. 2. The device identifier may comprise at least one of the following: a MAC address, motherboard serial number or a device identification number. The device identifier may further be a concatenation of at least two of the MAC address, motherboard serial number or device identification number. In a further example the device identifier may comprise a hash value associated with the MAC address, motherboard serial number or device identification number, or the concatenation described above.

The first user 23 may be the vendor of the computer software and the second user 24 may be the recipient ("end user") of the computer software. In another example the second user 24 may be the vendor of the computer software and the first user 23 may be the end user of the computer software.

In one example the licence associated with the computer software may authorise only one end user (a "single-user licence"). In a further example, the licence associated with the computer software may authorise one device of the end user (a "single-device licence"). In another example the licence associated with the computer software may authorise more than one device of the end user (a "multi-device licence").

In another example, there may be more than one end user (a "multi-user licence"). In a further example, the licence associated with the computer software may authorise one device per end user. In another example the licence associated with the computer software may authorise more than one device per end user.

In the event that the licence is associated with a first user 23 or a second user 24, the licence may comprise the first user public key (PU1) associated with the first user 23 and the second user public key (PU2) associated with the second user 24.

Merkle Tree

In another example, the licence may be the top hash value of a Merkle tree. An example of a Merkle tree is illustrated in FIG. 4. In a Merkle tree, the hash value at each node are hashes of their respective "child" nodes. For example, the hash value Hash-A 305 is the hash of the hash values at the two "child" nodes 309 and 311. It can be seen that the top hash value of the Merkle tree, Hash-AB 303, comprises all the hash values in the Merkle tree. That is, it captures the hash values of the four "leaves" at the bottom of the tree, A1 317, A2 319, B1 321 and B2 323.

In an example of the present disclosure, each "leaf" of the Merkle tree may represent an aspect of the information of the licence. An exemplary licence is illustrated in FIG. 5. The data (D1) 417 is captured in the hash value Hash-D 409, the executable of the software 419 is captured in the hash value Hash-S 411 (H1), the public keys 421 of users 23 and/or 24 are captured in the hash value Hash-P 413 and the expiry date 423 is captured in the hash value Hash-E 415. It can be seen that the nodes 405 and 407 capture the hash values associated with the leaves for data (D1) 417 and software 419, and public keys 421 and expiry date 423 respectively.

It is to be appreciated that other information not otherwise described above may comprise the additional information that the hash value (H2) is based on.

Sending the Data (D1), First Hash Value (H1) and Second Hash Value (H2) to a Distributed Hash Table 140

The method 100 also includes sending 140, over a communications network 5, the data (D1), first hash value (H1) and the second hash value (H2) to an entry on a distributed hash table 13.

In one example, the second hash value (H2) may be a key of a key-value pair, and the data (D1) and the first hash value (H1) may be a value in the key-value pair.

In a further example, additional information as described above may also be part of the value in the key-value pair. This includes but is not limited to: public keys of the first user 23 or second user 24, a device identifier of a device associated with the first node 3, second node 7, first user 23 or second user 24, an identifier indicative of the location of the computer software or licence, or further additional information associated with the licence.

As described above, a DHT 13 is comprised of key-value pairs, where each key-value pair is assigned to an index. In one example, the second hash value (H2) may be used to generate the index. A hash function or cryptographic hash function may be performed on the second hash value (H2). For instance, the cryptographic function SHA-1 may be used:

Index=SHA-1(H2)

For the second hash value (H2) to be the key of a key-value pair in the DHT 13, and the data (D1) and the first hash value (H1) to be the value in the key-value pair, the key and value are sent to any participating node of the DHT 13.

In one example, a message such as put(key, value) may be sent to a participating node of the DHT 13, where key is the second hash value (H2) and value is the data (D1) and the first hash value (H1). The message may be sent around all participating nodes until it is received by the participating node that is assigned to the index as indicated by the keyspace partitioning. The participating node assigned to the index indicated in the message may then store the key-value pair on the DHT 13 and assume responsibility for maintaining the entry associated with the key-value pair.

It is an advantage that the value of any given key may be retrieved from the DHT 13. In one example, the first user 23 or second user 24 may wish to retrieve the value. The first user 23 or second user 24, via the first node 3, second node 7 or another node not otherwise illustrated, may provide any participating node of the DHT 13 a request message such as get(key). The request message may then be sent around all participating nodes until it is received by the participating node that is assigned to the index as indicated by the keyspace partitioning.

Determining a Metadata (M) 150

The method 100 further includes determining 150 a metadata (M) that comprises the second hash value (H2). Determining 150 a metadata (M) may comprise receiving the metadata (M) from a user, node or data store. The metadata (M) may be included in, for example, in one or more of the 15 places available for the public keys in a P2SH multi-signature first redeem script (RS1) of a transaction on the P2P distributed ledger 14.

The first redeem script (RS1) of the transaction on the P2P distributed ledger 14 may represent an issuance, or creation, of a tokenised transaction ("issuance token") that represents the content included in the metadata (M). In one example, the token may be issued by an agent (A).

In the P2SH method of the Bitcoin protocol, metadata may be included in a redeem script as described below.

Metadata

Metadata (M) may be embedded in one or more of the 15 places available for the public keys in a P2SH multi-signature redeem script (RS1). For example, the redeem script (RS1) may take the form of:

<NumSigs Metadata1 Metadata2 . . . PubK1 PubK2 . . . NumKeys OP_CHECKMULTISIG> where Metadata1 and Metadata2 each include metadata that takes the place of a public key in the redeem script and PubK1 and PubK2 are public keys.

Metadata (M) may comprise the second hash value (H2). The metadata (M) may further comprise a description or keyword describing conditions associated with the computer software or licence. For example, the date of the licence, name, date of birth, address, contact details, or other details of the user associated with the licence. In a further example, information associated with the quantity of cryptocurrency may be included.

The metadata (M) may include the information in a number of ways. In one example, the contents of the information may be included. In a further example, a cryptographic hash of the information may be included. The hash of the information may be determined using the SHA-256 algorithm to create a 256-bit representation of the information. It is to be appreciated that other hash algorithms may be used, including other algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

In further embodiments of the present disclosure, combinations including one or more of the above may be included in the metadata (M). Since the metadata (M) may be made public by way of the P2P distributed ledger 14 such as the blockchain, or transmitted over an unsecure network, it may be desirable that specific details of the metadata (M) be veiled or hidden for privacy reasons.

Therefore, the use of multi-signature P2SH Bitcoin transactions in embodiments of the present disclosure offers an advantage as it enables the transfer and permanent record of information associated with the computer software and the licence. This record is achieved by including the metadata in the output script of a transaction, for example, a redeem script.

First Redeem Script

As described above, a redeem script is an example of an output script in the standard P2SH method of the Bitcoin protocol and describes how a user may gain access to the cryptocurrency specified in the transaction record.

In the present disclosure the first redeem script (RS1) for the issuance token may be based on the metadata (M). The first redeem script (RS1) may further comprise an agent public key (PA) that forms a cryptographic pair with an agent private key (VA). In this way, the agent private key (VA) is required to "unlock" or spend cryptocurrency that is associated with the transaction.

In one example, the first redeem script (RS1) for the issuance token may include the metadata (M). The first redeem script (RS1) may further comprise an agent public key (PA). In this example, the first redeem script (RS1) may be of the form:

<OP_1 PA Metadata1 Metadata2 OP_3 OP_CHECK-MULTISIG> where OP_1 denotes the number of signatures required to satisfy the first redeem script (RS1) to unlock the transaction ("NumSigs"), and OP_3 denotes the number of public keys in the redeem script ("NumKeys").

In this example, the first redeem script (RS1) may comprise two designated fields for the metadata, Metadata1 and Metadata2. A specific example of the Metadata1 and Metadata2 is illustrated in Table 1 below.

TABLE 1

| Field | Sub-field | Bytes | Comments |
| --- | --- | --- | --- |
| Metadata1 | LicenceType | 4 | Coded value indicates type of licence. |
| | LicencePointer | 16 | IPv6 address identifying the DHT. |
| | LicenceTypeData1 | 12 | Format depends on value of LicenceType. Padded with zeros. |
| Metadata2 | LicenceHash | 20 | RIPEMD-160(SHA256(actual licence file addressed by LicencePointer)) |
| | LicenceTypeData2 | 12 | Format depends on value of LicenceType. Padded with zeros. |

This example includes providing a pointer to the licence in Metadata1 which may be useful where the size of the licence precludes including such details in the metadata (M). Furthermore, since the metadata (M) may be made public, or transmitted over an unsecure network, it may be desirable that specific details of the token be veiled or hidden for privacy reasons.

The first 4 bytes of Metadata1 indicates the type of licence. For example, the licence type may denote the name of the computer software such as BobSoftware. In a further example the licence type may denote the authorisation type of the licence, such as "single-user" or "multi-device" as described above. The next 16 bytes holds the IP address of the location of the actual electronic licence file, making allowance for IPv6 addresses. Note that in some embodiments, this value may point to the seed of a torrent file such that the licence file can be distributed over the cloud rather than being centralised. The following 12 bytes contains data specific to the type of licence.

The first 20 bytes of Metadata2 is a hash of the actual licence file using RIPEMD-160 over SHA256 applied to the actual contents of the licence file. As the actual licence file may be retrievable this allows validation of the transaction against the contract. Note that the licence file itself may be completely public (unencrypted and human readable) or may be encrypted for privacy, depending on the requirements of the specific embodiment. The content of the remaining 12 bytes of Metadata2 may be used depending on the type of licence.

It can be seen from the example of the first redeem script (RS1) provided above that the issuance token must be signed by the agent (A) in order to be spent. An example of the transaction for the issuance token is provided in Table 2, where for brevity the miner's fee is not shown.

TABLE 2

| ID-600 | Transaction-ID |
| --- | --- |
| Version number | Version number |
| 1 | Number of inputs |
| ID-110 | Prev Trans Output |
| IDX-00 | Prev Trans Output index |
| Script length | Script length |
| OP_0 Sig-VA < redeem script ID-110 > | ScriptSig |
| 0000 0000 0000 0001 | Sequence number |
| 1 | Number of outputs |
| C1 | Output value |
| Output script length | Output script length |
| OP_HASH160 < hash of redeem script (RS1) > OP_EQUAL | Output script |
| LockTime | LockTime |

Lines 4 to 8 of Table 2 represent the input to the transaction which is the first quantity of cryptocurrency (C1) that is to be included in the issuance token (i.e. "tokenised"). In this example, the first quantity of cryptocurrency (C1) was the result of a previous transaction (ID-110) that transferred the first quantity of cryptocurrency to the benefit of the agent (A), and therefore the previous transaction (ID-110) output script (redeem script ID-110) includes the agent's public key (PA). Accordingly, to unlock this previous output the script (redeem script ID-110) must be signed with the first user's private key (VA). Finally, line 8 of Table 2 indicates that the first quantity of cryptocurrency (C1) will be the first output in this transaction (ID-600).

Lines 9 to 13 of Table 2 represent the first (and only) output of the transaction (ID-600), which in this case is representative of the issuance token being created and transferred back to the agent. Line 10 shows the output value, which is the first quantity of cryptocurrency (C1). Line 11 shows the output script, which includes a "<hash of redeem script>" as is used in the P2SH method of the Bitcoin protocol. In this example, the redeem script is the first redeem script (RS1) in the form as described above.

The output of the transaction (ID-600) shown in Table 2 is then recorded, with the first data output (O1), on the P2P distributed ledger 14. In particular, the first data output (O1) may comprise an indication of the first quantity of cryptocurrency (C1) that was transferred in the transaction. The first data output (O1) may further comprise a hash of the first redeem script (RS1).

In future transactions of the first quantity of cryptocurrency (C1), for example the transfer of the token to a first user 23 or second user 24, the script to unlock the first quantity of cryptocurrency (C1) (e.g. the input ScriptSig of the future transaction) may be in the form:

OP_0 Sig-VA Sig-VU1 <OP_1 PA PU1 Metadata1 Metadata2 OP_4 OP_CHECKMULTISIG> where Sig-VU1 indicates the signature of the first user 23. Note that the above script assumes that only one signature from the agent (A) or the first user 23 is required to unlock the first quantity of cryptocurrency (C1).

The issuance token may be transferred to another user by way of a second redeem script (RS2).

Variations

Second Redeem Script

The token that is associated with the computer software and licence may be transferred from the agent (A) to another user, for example the first user 23 or second user 24. In one example, the transfer of the token may be representative as authorising access to the user for the computer software or licence. The transfer may be implemented by a second redeem script (RS2).

In one example, the agent (A) wishes to transfer the issuance token to a first user 23. The first user 23 may represent, for example, a vendor of the computer software.

In this example, the second redeem script (RS2) may be based on the metadata (M), the agent public key (PA) associated with the agent (A) and the first user public key (PU1) associated with the first user 23.

The second redeem script (RS2) may be of the form:

<OP_1 PA PU1 Metadata1 Metadata2 OP_4 OP_CHECKMULTISIG>

In this example, the second redeem script (RS2) comprises the same two metadata fields as the first redeem script (RS1). The second redeem script (RS2) further comprises the agent public key (PA) associated with the agent and the first user public key (PU1) associated with the first user.

It can be seen from the example of the second redeem script (RS2) provided above that the token that is transferred must be signed by the agent (A) or the first user 23 in order to be spent. An example of the transaction for this transfer of the issuance token is provided in Table 3, where again for brevity the miner's fee is not shown.

TABLE 3

| ID-610 | Transaction-ID |
| --- | --- |
| Version number | Version number |
| 1 | Number of inputs |
| ID-600 | Prev Trans Output |
| IDX-00 | Prev Trans Output index |
| Script length | Script length |
| Sig-VA < OP_1 PA Metadata1 Metadata2 OP_3 OP_CHECKMULTISIG > | ScriptSig |
| 0000 0000 0000 0001 | Sequence number |
| 1 | Number of outputs |
| C1 | Output value |
| Output script length | Output script length |
| OP_HASH160 < hash of redeem script (RS2) > OP_EQUAL | Output script |
| LockTime | LockTime |

Similar to Table 2, lines 4 to 8 of Table 3 represent the input to the transaction (ID-610). In this example, the input is the issuance token, i.e. the output of the transaction (ID-600) that is illustrated in Table 2. It can be seen that the redeem script in line 7 corresponds to the redeem script of the issuance token, i.e. the first redeem script (RS1). Accordingly, to unlock the output of the transaction (ID-600) the first redeem script (RS1) must be signed with the agent's public key (PA).

Lines 9 to 13 of Table 3 represent the output of the transaction (ID-610), which in this case is representative of the issuance token being transferred to either the agent (A) or the first user 23 (U1). Line 10 shows the output value, which is the first quantity of cryptocurrency (C1). Line 11 shows the output script, which includes a "<hash of redeem script>" as is used in the P2SH method of the Bitcoin protocol. In this example, the redeem script is the second redeem script (RS2) in the form as described above.

The output of the transaction (ID-610) is then recorded, with a second data output (O2), on the P2P distributed ledger 14. The second data output (O2) may comprise an indication that the first quantity of cryptocurrency (C1) from the first data output (O1) is to be transferred in the transaction. The second data output (O2) may further comprise a hash of the second redeem script (RS2).

Identifier Indicative of the Location of the Computer Software or Licence

As described above the data (D1) or licence may comprise an identifier indicative of the location of the computer software or licence respectively.

In one example, the identifier may be determined independently to the data (D1) or the licence and remain separate to the data (D1) or licence. The identifier may further be assigned to the value of the key-value pair together with the data (D1) and the first hash value (H1) as described in the method 100 above. In this way, the identifier may be included in the value field of the message put(key, value) and sent to a participating node in the DHT 13, as described above.

In one example, the identifier indicative of the location may comprise a URL for an object on the Internet. In another example, the identifier indicative of the location may comprise an address for a repository such as a hash table or a DHT 13. In yet another example, the identifier indicative of the location may comprise an address for a computer-based repository such as a server, database or storage facility provided on a computer-based resource, such as the data store 17 associated with the first processing device 21 of the first node 3.

FIG. 6 illustrates a method 500 for determining location of the computer software or licence. The method 500 includes determining 510 the metadata (M) from the first redeem script (RS1). As described above, the metadata (M) may be embedded in one or more of the 15 places available for the public keys in the first redeem script (RS1).

In the P2SH method of the Bitcoin protocol, when the output of a transaction is spent in a subsequent transaction, the redeem script becomes visible in the subsequent transaction. As described above and with reference to Table 2, the transaction (ID-600) for the issuance token is paid back to the agent (A). In this way, the agent (A) may spend this issuance token to expose the first redeem script (RS1). The metadata (M) that is based on the second hash value (H2) is therefore visible on the P2P distributed ledger 14. In this way, the second hash value (H2) is able to be retrieved 520 from the metadata (M) in the first redeem script (RS1). In one example, the value associated with the key of the key-value pair is able to be retrieved from the DHT 13 using the request message get(key).

The method 500 further includes sending 530, over a communications network 5, the second hash value (H2) to a processor associated with a participating node of the DHT 13. As described above, the second hash value (H2) may be the key of the key-value pair. As also described above, the value for a given key may be retrieved by providing a message containing the key to any participating node of the DHT 13. Therefore, in the example where the identifier is included in the value field of the key-value pair, the method 500 is able to determine 540, from the processor of the participating node, the identifier indicative of the location of the computer software or licence.

Determining a Second User Public Key (PU2) Associated with a Second User (U2) 610

As described above the method 600 includes determining 610 a second user public key (PU2) associated with a second user (U2) from a transaction record stored on the P2P distributed ledger 14. Determining a second user public key (PU2) from a transaction record may comprise receiving the transaction record from a user, node or data store and querying the transaction record for the second user public key (PU2). Determining a second user public key (PU2) from a transaction record may further comprise accessing the transaction record at a user, node or data store and querying the transaction record for the second user public key (PU2).

In one example, the second node 7 associated with the second user 24 may receive the transaction record from the first node 3 or a data store 17 associated with the first node 3. In another example, the second node 7 may receive the transaction record from the first user 23 or second user 24.

In yet another example, the second node 7 may access the transaction record at the second node 7 or at a data store associated with the second node 7. In a further example, the transaction record may be accessed by the second node 7 using a publicly available facility such as www.blockchain-.info.

The transaction record stored on the P2P distributed ledger 14 may comprise information that identifies the transaction or users associated with the transaction. An example of the information comprised in a transaction record is shown in Table 4.

TABLE 4

| Field | Description |
| --- | --- |
| Version number | Indicates which rules of the Bitcoin protocol the transaction will follow |
| Number of inputs | Number of inputs |
| Inputs | At least one input |
| Number of outputs | Number of outputs |
| Outputs | At least one output |
| LockTime | A timestamp |

Each transaction output includes information on the amount of cryptocurrency transferred and an output script that defines the conditions required to be satisfied to spend the cryptocurrency. The output script typically includes a public key associated with a recipient of the cryptocurrency.

In one example, the public key associated with the recipient of the cryptocurrency in the output script may be the second user public key (PU2). In this way, the second user public key (PU2) associated with the second user (U2) is determined from the output script on the transaction record stored on the P2P distributed ledger 14.

As described above, in the P2SH method of the Bitcoin protocol the output script is the redeem script. The redeem script may include a number of public keys associated with the sender and recipient of the cryptocurrency. In one example, the second user public key (PU2) associated with the second user (U2) may be determined from the redeem script of the transaction record.

In another example, the second user public key (PU2) may be stored in the metadata (M) of the redeem script. As described above, in the P2SH method when the output of the transaction is spent in a subsequent transaction, the redeem script becomes visible on the P2P distributed ledger 14. In this way, the second user public key (PU2) is able to be retrieved from the metadata (M) in the redeem script.

Determining a Second Public Key (P2) Associated with the Second User (U2) 620

The method 600 further includes determining 620 a second public key (P2) associated with the second user (U2) from an entry stored on the DHT 13. Determining a second public key (P2) may comprise retrieving a value of the key-value pair associated with the entry stored on the DHT 13. Determining a second public key (P2) may also comprise receiving the value of the key-value pair from another node.

In one example, the value of the key-value pair associated with the entry on the DHT 13 may be retrieved by sending a request message to a participating node of the DHT 13. As described above, the request message may comprise get (key), where key is the key for the key-value pair associated with the entry on the DHT 13.

In a further example, the key of the key-value pair is the second hash value (H2).

In another example, the second node 7 may receive the value stored on the DHT 13 from the first node 3 or another node not otherwise illustrated. The first node 3 or other node may provide a participating node of the DHT 13 the request message get(key). The first node 3 or other node may then receive the value of the key-value pair associated with the entry on the DHT 13. The value of the key-value pair may then be sent to the second node 7 from the first node 3 or other node over the communications network 5.

Comparing the Second User Public Key (PU2) and the Second Public Key (P2) 630

The method further includes comparing 630 the second user public key (PU2) and the second public key (P2). Comparing may comprise determining whether the second user public key (PU2) and the second public key (P2) match.

In one example, a match may indicate that the second user public key (PU2) and the second public key (P2) are equivalent.

In another example, a match may indicate that the second user public key (PU2) and the second public key (P2) belong to the same cryptocurrency wallet.

In a further example, the cryptocurrency wallet may be a deterministic wallet and a match may indicate that the second user public key (PU2) and the second public key (P2) are derived from a common seed. The common seed may be a sequence of characters.

Verifying the Ownership of the Computer Software Based on the Comparing 640

The method 600 further includes verifying 640 the ownership of the computer software based on the comparing of the second user public key (PU2) and the second public key (P2).

In one example, verifying the ownership of the computer software occurs if the comparing determines the second user public key (PU2) and the second public key (P2) match. Verification may involve permitting or enabling a user to use or interact with the software or otherwise perform some act in relation to the software if a match has been established.

Variations

Computer Software

The computer software may comprise a header and a body. In one example, the header may comprise information associated with the computer software. In a further example, the header may comprise a hash value of the body of the computer software. In yet a further example, the header may comprise the second hash value (H2) as described above.

The body of the computer software may comprise an executable of the computer software.

Encrypting the Executable of the Computer Software

In the method 600 described above, before determining the second user public key (PU2), the method 600 may comprise encrypting the executable of the computer software.

In one example, the executable of the computer software is encrypted with a public key associated with the first user 23 or second user 24. In another example, the executable of the computer software is encrypted with a public key associated with the first node 3 or second node 7. In yet another example, the executable of the computer software is encrypted with a public key associated with a third party or a node not otherwise illustrated.

In another example, the executable of the computer software may be encrypted using a common secret sharing approach as provided below.

Determining the Common Secret (CS)

A common secret for encryption may be determined at the nodes 3, 7 by the users 23, 24 associated with the nodes by performing the steps of the methods 300, 400 respectively as illustrated in FIG. 8. In this way, the common secret may be independently determined without communicating private keys associated with the users 23, 24 over the communications network 5.

As illustrated in FIG. 8, the method 300 performed by the first user 23 includes determining 300 a first user second private key (V2U1) based on at least a first user private key (VU1) and a generator value (GV). The first user private key (VU1) forms a cryptographic pair with the first user public key (PU1).

The generator value may be based on a message that is shared between the first user 23 and second user 24, which may include sharing the message over the communications network 5. The method 300 also includes determining 370 a second user second public key (P2U2) based on at least the second user public key (PU2) and the generator value (GV). The method 300 further includes determining 380, at the first user 23, the common secret (CS) based on the second user second public key (P2U2) and the first user second private key (V2U1).

Significantly, the same common secret (CS) can be determined by the second user 24 associated with the second node 7 by method 400. The method 400 includes determining 430 a first user second public key (P2U1) based on the first user public key (PU1) and the generator value (GV). The method 400 further includes determining 470 a second user second private key (V2U2) based on the second user private key (VU2) and the generator value (GV). The second user private key (VU2) forms a cryptographic pair with the second user public key (PU2).

The method 400 further includes determining 480, at the second user 24, the common secret (CS) based on the first user second public key (P2U1) and the second user second private key (V2U2). The methods 300, 400 may be repeated to yield first user additional public keys or second user additional public keys.

Encrypting the Executable of the Computer Software

The common secret (CS) may be used as the basis to generate a symmetric-key for encryption. In one example, the common secret (CS) may be in the form of an elliptic curve point $(x_s, y_s)$. This may be converted into a standard key format using standard operations agreed by nodes 3, 7. For example, the $x_s$ value may be a 256-bit integer that could be used as a key for $AES_{256}$ (Advanced Encryption Standard) encryption. It could also be converted into a 160-bit integer using RIPEMD160. Methods 700, 800 of secure communication with encryption by the first user 23 will now be described with reference to FIG. 9.

In the exemplary embodiment provided below, the first user 23 associated with the first node 3 performs the method 700 of encrypting the executable of the computer software. It is to be understood that the method 700 can equally be applied to the second user 24 at the second node 7.

The first user 23 determines 710 a symmetric-key based on the common secret (CS) determined in the method 300, 400 above. This may include converting the common secret (CS) to a standard key format as described above. Similarly, the second user 24 can also determine 810 the symmetric-key based on the common secret (CS).

The symmetric-key may be used by the first user 23 for encrypting 720 the executable of the computer software to form an encrypted executable of the computer software. The encrypted executable of the computer software is then included 730 into the body of the computer software.

The computer software comprising the encrypted executable of the computer software may be sent 740, over the communications network 5, to a storage location. In one example, the storage location may be a repository such as a hash table or the DHT 13. In another location, the storage location may be on the Internet. In yet another example, the storage location may be a computer-based repository such as a server, database or storage facility provided on a computer-based resource, such as the data store 17 associated with the first processing device 21 of the first node 3.

The second user 24, in turn, determines the encrypted executable of the computer software. Determining the encrypted executable of the computer software may comprise downloading the computer software from the storage location as described above. In one example, the second user 24 downloads the encrypted executable of the computer software from an entry on the DHT 13.

The second user 24 may decrypt 830 the encrypted executable of the computer software, with the symmetric-key, to the executable of the computer software.

Installing the Computer Software

The executable of the computer software may comprise instructions that cause a second processing device 27 associated with the second user 24 to install the computer software. In one example, the computer software is installed on the second processing device 27 after the second user 24 decrypts 830 the encrypted executable of the computer software.

In a further example, an activation key (AK) is determined from the second user 24 after the second user 24 decrypts 830 the encrypted executable of the computer software. In one example, a user interface associated with the second processing device 27 may prompt the second user 24 for the activation key (AK). The second user 24 may provide the activation key (AK) by an input device associated with the second processing device 27, such as a keyboard device, touch screen or touch pad device, mouse device or microphone device.

The activation key (AK) may be deterministically derived from a seed activation key. In one example, the first user 23 may determine a seed activation key at the first node 3. The first user 23 may then determine a generator value (GV) based on a message. The activation key (AK) may then be determined based on the seed activation key and the generator value (GV).

Processing Device

As noted above, the first node 3 and second node 7 may be an electronic device, such as a computer, tablet computer, mobile communication device, computer server etc. The electronic device may include a processing device 21, 27, a data store 17 and a user interface 15.

FIG. 10 illustrates an example of a processing device 21, 27. The processing device 21, 27 may be used at the first node 3, second node 7 or other nodes not otherwise illustrated. The processing device 21, 27 includes a processor 1510, a memory 1520 and an interface device 1540 that communicate with each other via a bus 1530. The memory 1520 stores a computer software program comprising machine-readable instructions and data for implementing the method 100, 300, 400, 600, 700 and 800 described above, and the processor 1510 performs the instructions from the memory 1520 to implement the method 100, 300, 400, 600, 700 and 800. The interface device 1540 may include a communications module that facilitates communication with the communications network 5, and in some examples, with the user interface 15 and peripherals such as data store 17. It should be noted that although the processing device 1510 may be an independent network element, the processing device 1510 may also be part of another network element. Further, some functions performed by the processing device 1510 may be distributed between multiple network elements. For example, the first node 3 may have multiple processing devices 21 to perform method 100, 300, 400, 600, 700 and 800 in a secure local area network associated with the first node 3.

Where this disclosure describes that a user, employer, employee, issuer, merchant, provider or other entity performs a particular action (including signing, issuing, determining, calculating, sending, receiving, creating etc), this wording is used for the sake of clarity of presentation. It should be understood that these actions are performed by the computing devices operated by these entities.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method of verifying authorized control of a controlled digital asset using a peer-to-peer distributed ledger and a separate storage resource, the method comprising:
   determining, from a metadata (M) in a redeem script of a transaction record stored on the peer-to-peer distributed ledger, a hash value (H2) representative of details of the controlled digital asset and a second user public key (PU2) associated with a second user (U2);
   determining a second public key (P2) associated with the second user (U2) from an entry retrieved from the separate storage resource using the hash value (H2) as the key of a key-value pair stored on the separate storage resource;
   determining a generator value (GV);
   determining a second user second public key (P2U2) based on the second user public key (PU2) and the generator value (GV), wherein the second user second public key (P2U2) forms a cryptographic pair with a second user second private key (V2U2);
   determining a first user second public key (P2U1) based on a first user public key (PU1) and the generator value (GV), wherein the first user second public key (P2U1) forms a cryptographic pair with a first user second private key (V2U1);
   determining a common secret (CS) based on the second user second public key (P2U2) and the first user second private key (V2U1);
   encrypting the controlled digital asset with the common secret (CS) to generate an encrypted controlled digital asset, wherein the encrypted controlled digital asset is decrypted by:
      determining the common secret (CS) based on the first user second public key (P2U1) and the second user second private key (V2U2); and
      decrypting the controlled digital asset with the common secret (CS) to generate a decrypted controlled digital asset;
   comparing the second user public key (PU2) and the second public key (P2); and
   verifying ownership of the controlled digital asset based on the comparing of the second user public key (PU2) and the second public key (P2).

2. The method of claim 1, wherein:
the controlled digital asset is a portion of item of software; or
the separate storage resource is a distributed hash table; or
the method further comprises sending, over a communications network:
data (D1) associated with the controlled digital asset;
a first hash value (H1) based on the controlled digital asset; and
a second hash value (H2) based on the controlled digital asset and the first hash value (H1); or
wherein the second hash value (H2) is assigned to a key of a key-value pair and the data (D1) and the first hash value (H1) are assigned to the value in the key-value pair, wherein the value of the key-value pair comprises an identifier indicative of a location of the controlled digital asset; or
comparing the second user public key (PU2) and the second public key (P2) comprises determining whether the second user public key (PU2) and the second public key (P2) match.

3. The method of claim 1, wherein the controlled digital asset comprises a header and a body.

4. The method of claim 3, wherein the header comprises a hash value of the body of the controlled digital asset.

5. The method of claim 3, wherein the header further comprises the hash value (H2) of a data associated with the controlled digital asset or a licence.

6. The method of claim 3, wherein the body of the controlled digital asset comprises an executable of a portion or item of computer software.

7. The method of claim 6, wherein before determining the second user public key (PU2), the method comprises encrypting the executable of the computer software.

8. The method of claim 7, further comprising:
installing the decrypted executable of the computer software on a processing device associated with the second user (U2).

9. The method of claim 8, further comprising:
determining an activation key (AK) from the second user (U2); and executing instructions of the decrypted executable of the computer software based on the activation key (AK).

10. A non-transitory machine readable storage medium comprising instructions embodied thereon for a computer software program for verifying ownership of a controlled digital asset for installation using a peer-to-peer distributed ledger and a separate storage resource, the instructions when executed cause a processing device to:

determine, from a metadata (M) in a redeem script of a transaction record stored on the peer-to-peer distributed ledger, a hash value (H2) representative of details of the controlled digital asset and a second user public key (PU2) associated with a second user (U2);

determine a second public key (P2) associated with the second user (U2) from an entry retrieved from the separate storage resource using the hash value (H2) as the key of a key-value pair stored on the separate storage resource;

determine a generator value (GV);

determine a second user second public key (P2U2) based on the second user public key (PU2) and the generator value (GV), wherein the second user second public key (P2U2) forms a cryptographic pair with a second user second private key (V2U2);

determine a first user second public key (P2U1) based on a first user public key (PU1) and the generator value (GV), wherein the first user second public key (P2U1) forms a cryptographic pair with a first user second private key (V2U1);

determine a common secret (CS) based on the second user second public key (P2U2) and the first user second private key (V2U1);

encrypt the controlled digital asset with the common secret (CS) to generate an encrypted controlled digital asset, wherein the encrypted controlled digital asset is decrypted by:

determining the common secret (CS) based on the first user second public key (P2U1) and the second user second private key (V2U2); and decrypting the controlled digital asset with the common secret (CS) to generate a decrypted controlled digital asset;

compare the second user public key (PU2) and the second public key (P2); and verify the ownership of the controlled digital asset based on comparing of the second user public key (PU2) and the second public key (P2).

11. A computer system for verifying ownership of a controlled digital asset for installation using a peer-to-peer distributed ledger and a separate storage resource, the computer system comprising a processing device associated with a node on a peer-to-peer network of nodes, configured to:

determine, from a metadata (M) in a redeem script of a transaction record stored on the peer-to-peer distributed ledger, a hash value (H2) representative of details of the controlled digital asset and a second user public key (PU2) associated with a second user (U2);

determine a second public key (P2) associated with the second user (U2) from an entry retrieved from the separate storage resource using the hash value (H2) as the key of a key-value pair stored on the separate storage resource;

determine a generator value (GV);

determine a second user second public key (P2U2) based on the second user public key (PU2) and the generator value (GV), wherein the second user second public key (P2U2) forms a cryptographic pair with a second user second private key (V2U2);

determine a first user second public key (P2U1) based on a first user public key (PU1) and the generator value (GV), wherein the first user second public key (P2U1) forms a cryptographic pair with a first user second private key (V2U1);

determine a common secret (CS) based on the second user second public key (P2U2) and the first user second private key (V2U1);

encrypt the controlled digital asset with the common secret (CS) to generate an encrypted controlled digital asset, wherein the encrypted controlled digital asset is decrypted by:

determining the common secret (CS) based on the first user second public key (P2U1) and the second user second private key (V2U2); and decrypting the controlled digital asset with the common secret (CS) to generate a decrypted controlled digital asset;

compare the second user public key (PU2) and the second public key (P2); and verify the ownership of the controlled digital asset based on comparing of the second user public key (PU2) and the second public key (P2).

* * * * *